United States Patent [19]

Edwards

[11] Patent Number: 4,486,702
[45] Date of Patent: Dec. 4, 1984

[54] VOLTAGE REGULATOR WITH NON-LINEAR EXCITATION CONTROL

[75] Inventor: Arthur J. Edwards, River Grove, Ill.

[73] Assignee: Motorola, Inc., Schaumburg, Ill.

[21] Appl. No.: 580,571

[22] Filed: Feb. 14, 1984

[51] Int. Cl.³ .......................... H02J 7/14; H02P 9/30; G05F 1/56

[52] U.S. Cl. ........................................ 322/28; 320/64; 322/73

[58] Field of Search ...................... 320/64, 68; 322/28, 322/59, 73; 323/283

[56] References Cited

U.S. PATENT DOCUMENTS

| | | | |
|---|---|---|---|
| 3,984,755 | 10/1976 | Lehnhoff et al. | 322/28 |
| 4,386,310 | 5/1983 | Sievers | 322/28 |
| 4,388,586 | 6/1983 | Lamoth | 323/283 |
| 4,388,587 | 6/1983 | Lamoth et al. | 323/283 |

FOREIGN PATENT DOCUMENTS 1392096  4/1975  United Kingdom ................. 320/64

*Primary Examiner*—R. J. Hickey
*Attorney, Agent, or Firm*—James W. Gillman; Margaret M. Parker

[57] ABSTRACT

An alternator regulator utilizes a non-linear, stepped ramp for use by a comparator which compares the ramp voltage with the alternator output and controls the switching of the excitation current accordingly. The non-linearity allows for tight control at low and normal alternator load levels, but also prevents a loss of accurate control at higher loads. A D/A converter makes the non-linearity possible, thus preventing the loss of control pulses at high loads, which loss can cause a large ripple component and excessive drop in average voltage output.

7 Claims, 4 Drawing Figures

1

VOLTAGE REGULATOR WITH NON-LINEAR EXCITATION CONTROL

BACKGROUND OF THE INVENTION

This invention relates to the field of voltage regulators for use with automobile battery charging systems and, more particularly, to a means of providing more accurate regulation when the system is operating at or near full load.

Battery charging systems should, ideally, supply a constant voltage, regardless of the load required. In electronic voltage regulators this is accomplished by switching on and off the field or excitation current which produces the electromagnetic field of the alternator. The switching control signal is produced by a comparator which compares a ramp, which may or not be stepped, with the alternator output signal. As the alternator load increases, the duty cycle of the regulator output signal can become 100%, causing the control pulses for the excitation to be entirely skipped. When control pulses are skipped, the average voltage output is reduced, and if the switching rate is too low, flicker of the automobile lamps may be objectionable, and other electronic devices may likewise be affected. In one prior art system, a "fixed frequency" voltage regulator having a variable duty cycle was provided, the "fixed frequency" referring to the clock signal Which controls the "stairstep" modulation on the reference voltage of the regulator.

DETAILED DESCRIPTION OF THE INVENTION

Figures 1, 2:
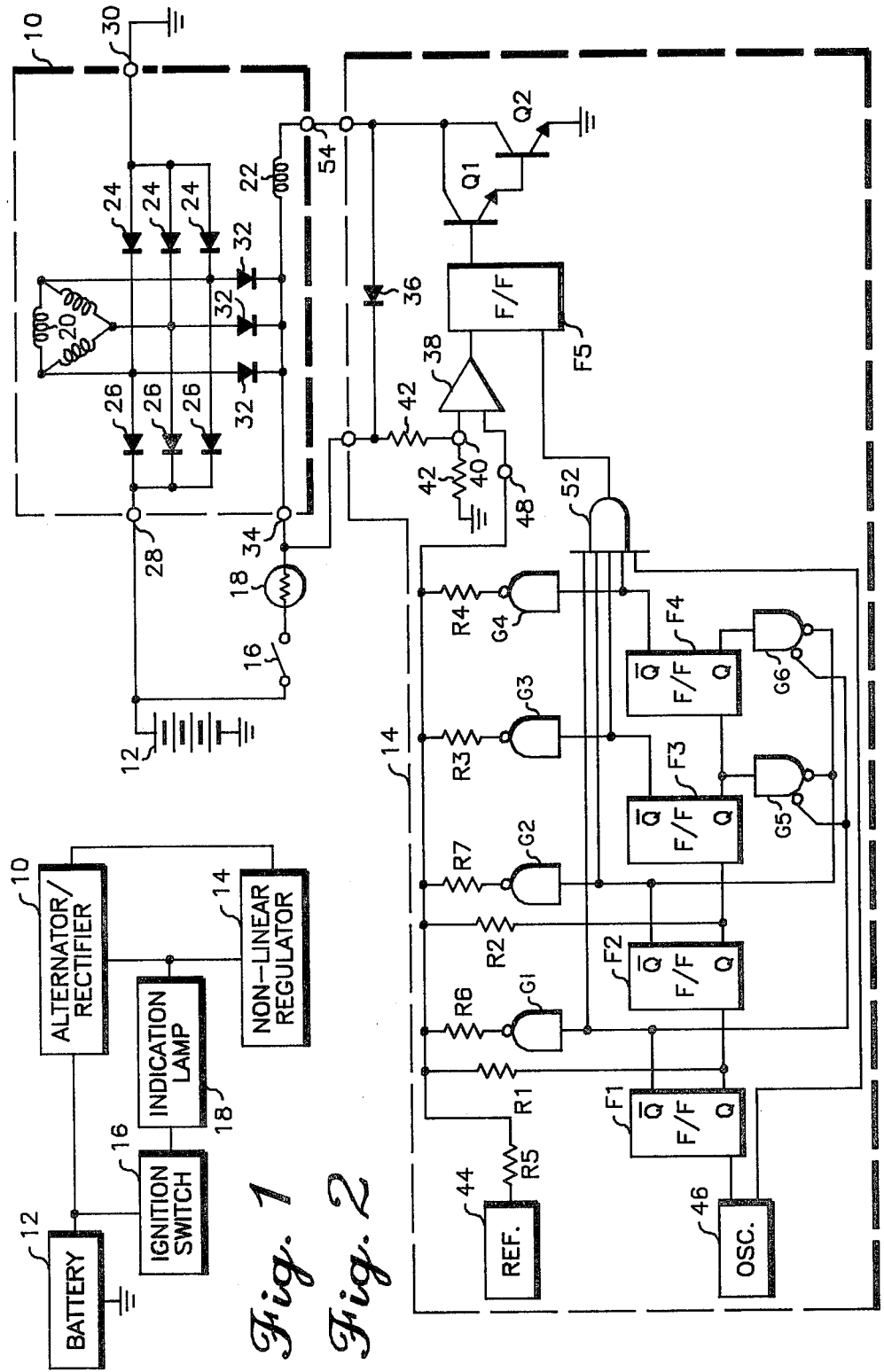
FIG. 1 is a block diagram of an alternator system including the present invention.
FIG. 2 is a circuit diagram showing details of the alternator and regulator of FIG. 1.

In FIG. 1, an alternator 10 is coupled to charge a battery 12. The alternator, as will be seen in FIG. 2, includes the usual diode rectifiers. The output of the alternator 10 is controlled by a regulator 14, and an ignition switch 16 and indicator lamp 18 are coupled to the rectifier output.

FIG. 2 illustrates the use of the present invention in a specific alternator system, however, the details of the environment as shown are not to be construed as limiting upon the invention. The alternator 10 may have a delta-connected, three-phase winding 20 on the stator and a field winding 22 on the rotor. The windings of the stator 20 are connected by way of two diode trios 24,26 to the battery 12 via a plus terminal 28, and to ground at a terminal 30. A third diode trio 32 is coupled from the stator winding 20 to the field winding 22 by way of a terminal 34. Another diode 36 is coupled across the field winding 22 to handle back currents in that winding. The indicator lamp 18 is also coupled to the terminal 34 and, when the ignition switch 16 is closed, to the terminal 28. Thus, when the switch 16 is closed, the lamp 18 will only be illuminated when the voltage at the terminal 28 is not the same as the voltage at the terminal 34; an indication that the alternator is not rotating. The lamp could be replaced by or combined with an indicator such as a meter. The lamp is powered by the battery 12.

Within the regulator 14 there is a comparator 38 which is coupled via a terminal 40 of a voltage divider 42 to the alternator terminal 34. A precision reference voltage is supplied to the regulator by a reference source 44 which could include an adjustment for temperature coefficient (not shown). An oscillator 46 supplies a fixed frequency output signal for clocking a series of flip-flops F1-F4. The four flip-flops are coupled to the reference voltage source 44 and are also interconnected through resistors and logic gates (the operation of which will be explained hereinbelow). The output signal at a terminal 48 is thus a ramp which is coupled to the second input of the comparator 40. The comparator output is coupled to a flip-flop or latch F5. The not-Q outputs of the flip-flops F1-F4 are ANDed in a logic gate 52 and the gate 52 output is coupled to the second input of the flip-flop F5. The flip-flop F5 output is coupled to control a Darlington-connected pair of transistors Q1,Q2. The collectors of Q1 and Q2 are coupled to a terminal 54 to which the field winding 22 is connected. The transistors Q1,Q2 enable the excitation current in the field winding 22.

In the prior art regulator mentioned above, each of the flip-flops F1-F4 was simply coupled to resistors R1-R4 (ratios 8,4,2,1) and the resistors were coupled to a resistor R5 and to the terminal 48 of the comparator 38. The signal at the terminal 48 was the reference voltage from the source 44 attenuated by the frequency divider outputs thus forming a stepped ramp having sixteen equal amplitude steps. In the circuit of FIG. 2, the regulator is seen to include, in addition to the resistors R1-R5 and gate 52, two resistors R6,R7, and six inverting logic gates G1-G6.

As shown, the flip-flops F1-F4 function as a 4-bit binary counter, providing 16 distinct outputs at the parallel outputs. When these outputs are combined with the reference voltage, a linearly stepped ramp would be provided, were it not for the additional outputs via R6 and R7. The amplitude of the ramp is a function of the ratios of the resistors R1-R6. Gates G3 and G4 serve to buffer and invert the not-Q outputs of F4 and F5 in this particular embodiment of the circuit since the Q outputs may not be able to handle the current required.

The non-linearity of the ramp is provided via G5 and G6 from the Q outputs of F3 and F4 in such a manner that the last three steps of the ramp are larger than the preceding 13 steps. The amount of non-linearity is determined by the resistor values. The ratios of the resistor values of R1-R6 are 8,4,2,1,4 and 2, respectively, in this embodiment. In some embodiments of the invention, the non-linearity may extend to more than the three last steps, or it may only involve the last step.

Figure 3A:
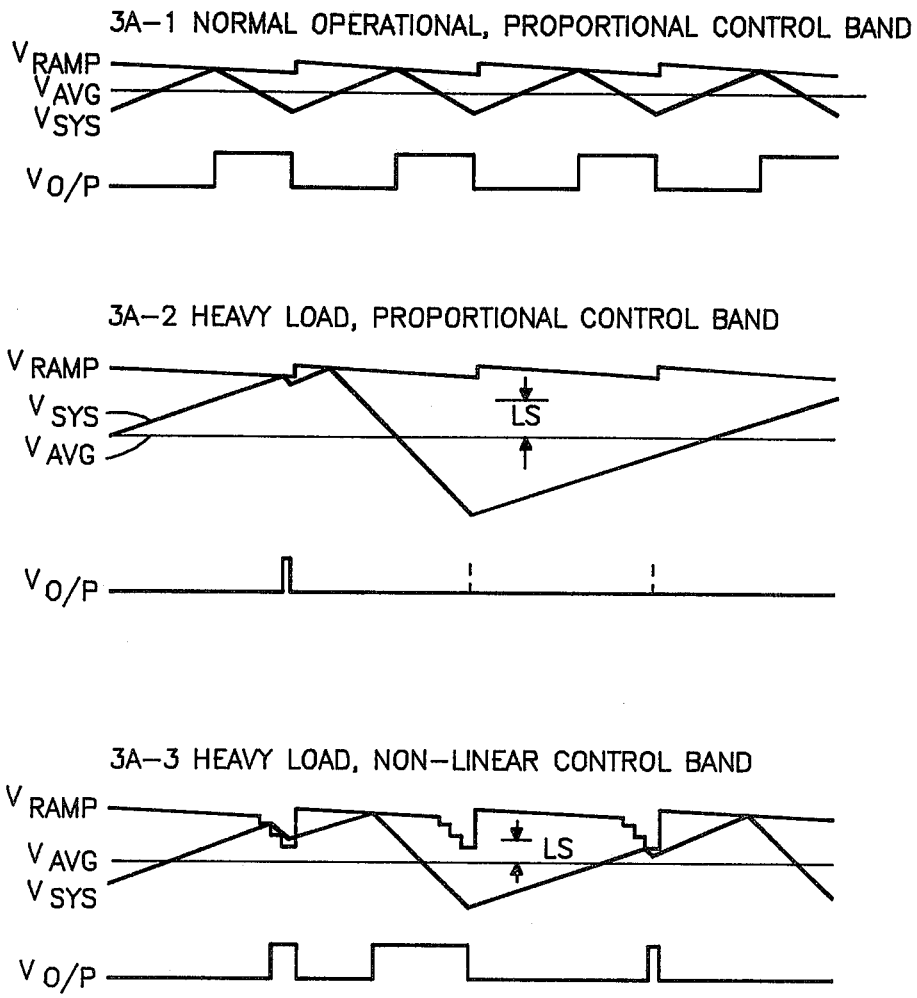
FIG. 3a is a chart of waveforms relating to the operation of the system of FIG. 2.
Figure 3B:
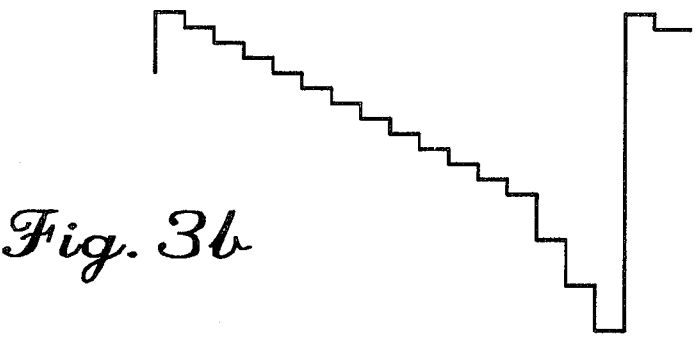
FIG. 3b is an expanded view of one of said waveforms.

The waveforms of FIGS. 3a,3b will be useful in understanding the operation of the regulator 14 in FIG. 2. No attempt has been made to scale the waveforms in these figures. FIG. 3A-1 is a chart of a prior art regulator, with a tight control band, during normal load operation. Each slope of the $V_{RAMP}$ is shown in this figure as a straight line for simplicity, but is actually a stepped ramp as shown in the first portion of FIG. 3b. The label "Proportional Control Band" refers to the fact that the control of the field current is proportional to the load. $V_{SYS}$ is the system voltage at the terminal 40 as inputted to the comparator 38, and $V_{AVG}$ is the average of $V_{SYS}$. $V_{O/P}$ is the excitation voltage, showing that until the system voltage equals the ramp voltage, the control voltage from F5 is high and the excitation voltage at the collectors of Q1,Q2 is low. At this point, the excitation control is turned off and stays off until the beginning of the next ramp. Under this normal load condition, the prior art regulator system works fairly satisfactorily, but 3A-2 illustrates the problem which arises at heavy loads.

As may be seen in the chart 3A-2, the system voltage rises more slowly under heavy load and may not equal the ramp voltage until near the end of the downramp portion. Under these conditions, the duty cycle approaches 100%, which still allows the alternator to function moderately well, although the average system voltage will be greatly reduced, lowering the efficiency of the system. This effect is known as "load slump"(LS). LS in 3A-2 is the difference between $V_{AVG}$ in 3A-1 and in 3A-2. In chart 3A-3, it is the difference between $V_{AVG}$ in 3A-1 and in 3A-2. However, if the system voltage does not equal the ramp voltage before the beginning of the next ramp, not even a brief pulse will appear in the excitation voltage. (Skipped pulses are indicated by dashed lines.) This skipping of pulses produces a much larger ripple component in the alternator output which can be a serious problem in the electrical system of an automobile.

The chart 3A-3 shows the result of adding the present invention to the alternator system of the prior art. Here the ramp has 13 small linear steps (See FIG. 3b) and three larger ones. The amount of non-linearity desired will be determined by the specific application and environment of the system. In this instance, a heavy load condition exists, and the system voltage does not rise to the ramp voltage until near the end of the first ramp shown. However, a short pulse is created in the excitation control signal, causing the system voltage to again fall. Therefore, the fall time is fairly short before the logic network again turns off the excitation control voltage (turning on the excitation current). The third ramp is intercepted at the last step and a very brief pulse is created before the system voltage begins to increase again. It can easily be seen that the "load slump" (LS) or reduction in the average output of 3A-3 is much less than in 3A-2 above. It is also apparent that the ripple frequency is higher in 3A-3 than in 3A-2, as is desirable.

Thus there has been shown and illustrated an improvement to the known alternator regulator art which, by de-linearizing the reference ramp, decreases the load slump, and increases the ripple frequency of the alternator output, while requiring only a few additional components. The specific circuitry for producing this improvement will be a factor of the environment and of the characteristics of the implementation in discrete components or in an integrated circuit. Many variations and modifications are possible, and it is intended to cover all such as fall within the scope of the appended claims.

What is claimed is:

1. An alternator regulator for use with an alternator system including a source of alternating current, rectifier means coupled to rectify the current, and means for supplying an electromagnetic field for said source, the regulator comprising:

reference means for supplying a predetermined reference voltage;

oscillator means for supplying a fixed frequency clock signal;

a logic network coupled to the reference means and the oscillator means for supplying a non-linear stepped voltage ramp;

comparator means for comparing the stepped ramp with the output of the alternating current source;

enabling means for enabling the field supplying means;

latching means coupled receive the comparator means output and a second output of the logic network for controlling the enabling means in response thereto.

2. An alternator regulator according to claim 1 and wherein the non-linear stepped ramp comprises a series of generally even steps but with at least the last step larger than the previous steps.

3. An alternator regulator according to claim 1 and wherein the latching means controls the enabling means for preventing current flow in the field supplying means in response to an output of the alternating current source equal to or greater than the stepped voltage ramp.

4. An alternator regulator according to claim 1 wherein the latching means is a flip-flop circuit.

5. An alternator regulator according to claim 1 wherein the enabling means is a pair of Darlington-connected transistors.

6. An alternator regulator according to claim 1 wherein the logic network comprises a plurality of stages, each stage including frequency divider means and resistor means coupled to the output of the divider means and to an input terminal of the comparator, and wherein the resistance values of the respective resistor means are chosen to provide a total voltage at said input termianl which decreases with time over one period of the oscillator means, and further wherein the outputs of at least one of the divider means is coupled back to increase at least the last one of said voltage steps.

7. An alternator regulator according to claim 6 wherein the logic network further includes an AND gate coupled to the oscillator means and the divider means outputs for providing an input to the latching means.

* * * * *